(12) United States Patent
Liu et al.

(10) Patent No.: US 11,265,783 B2
(45) Date of Patent: Mar. 1, 2022

(54) HANDOVER PROCESSING METHOD, NETWORK DEVICE, TERMINAL DEVICE, AND COMPUTER STORAGE MEDIUM

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/918,336

(22) Filed: Jul. 1, 2020

(65) Prior Publication Data
US 2020/0336961 A1  Oct. 22, 2020

Related U.S. Application Data

(63) Continuation of application No. PCT/CN2018/072137, filed on Jan. 10, 2018.

(51) Int. Cl.
*H04W 4/00* (2018.01)
*H04W 36/08* (2009.01)
(Continued)

(52) U.S. Cl.
CPC ....... *H04W 36/08* (2013.01); *H04W 36/0085* (2018.08); *H04W 36/32* (2013.01); *H04W 76/30* (2018.02)

(58) Field of Classification Search
CPC . H04W 36/08; H04W 76/30; H04W 36/0085; H04W 36/32; H04W 76/38;
(Continued)

(56) References Cited

U.S. PATENT DOCUMENTS 10,470,096 B2 * 11/2019 Takahashi ............. H04L 1/0009
10,568,011 B2 *  2/2020 Lin ....................... H04W 36/08
(Continued)

FOREIGN PATENT DOCUMENTS

CN        102271374 A       12/2011
CN        103167569 A        6/2013
(Continued)

OTHER PUBLICATIONS

Extended European Search Report for EP Application 18899866.0 dated Dec. 10, 2020.
(Continued)

*Primary Examiner* — Amancio Gonzalez
(74) *Attorney, Agent, or Firm* — Young Basile Hanlon & MacFarlane, P.C.

(57) ABSTRACT

Disclosed are a handover processing method, a network device, a terminal device, and a computer storage medium. The method comprises: when a first network device located in a first system network or a first core network is connected to a terminal device, the first network device establishes a candidate connection between the terminal device and a target system network or a target core network, wherein the candidate connection is used for handover to the target system network or the target core network when the terminal device meets a preset condition.

20 Claims, 4 Drawing Sheets

(51) Int. Cl.
*H04W 76/30* (2018.01)
*H04W 36/00* (2009.01)
*H04W 36/32* (2009.01)

(58) Field of Classification Search
CPC ..... H04W 88/06; H04W 48/18; H04W 36/18; H04W 36/30; H04W 36/0022; H04W 36/12; H04W 36/0016; H04W 36/125; H04W 36/00837; H04W 36/26; H04W 36/14
USPC ........................................................ 370/331
See application file for complete search history.

(56) References Cited

U.S. PATENT DOCUMENTS

| | | | |
|---|---|---|---|
| 10,708,838 B2* | 7/2020 | Tang | H04W 36/22 |
| 10,869,244 B2* | 12/2020 | Kim | H04W 36/34 |
| 10,917,822 B2* | 2/2021 | Yang | H04W 36/30 |
| 2008/0175200 A1 | 7/2008 | Stammers et al. | |
| 2010/0098021 A1 | 4/2010 | Stammers et al. | |
| 2010/0309886 A1* | 12/2010 | Vikberg | H04W 36/0066 370/332 |
| 2011/0176511 A1 | 7/2011 | Sayeedi | |
| 2012/0120789 A1* | 5/2012 | Ramachandran | H04W 36/0022 370/220 |
| 2016/0262059 A1* | 9/2016 | Butala | H04W 36/0033 |
| 2017/0070921 A1 | 3/2017 | Lau et al. | |
| 2020/0015128 A1* | 1/2020 | Stojanovski | H04W 36/0022 |
| 2021/0051746 A1* | 2/2021 | Shi | H04W 88/10 |
| 2021/0105684 A1* | 4/2021 | Hong | H04W 36/22 |

FOREIGN PATENT DOCUMENTS

| | | |
|---|---|---|
| CN | 106347419 A | 1/2017 |
| EP | 2934043 A1 | 10/2015 |

OTHER PUBLICATIONS

3GPP TS 23.502 V15.0.0 (Dec. 2017); 3rd Generation Partnership Project; Technical Specification Group Services and System Aspects; Procedures for the 5G System; Stage 2 (Release 15).
3GPP TS 23.501 V0.4.0 (Apr. 2017); 3rd Generation Partnership Project; Technical Specification Group Services and System Aspects; System Architecture for the 5G System; Stage 2 (Release 15).
3GPP TS 23.501 V0.34.1 0 (2017-0304); 3rd Generation Partnership Project; Technical Specification Group Services and System Aspects; System Architecture for the 5G System; Stage 2 (Release 15).
3GPP TS 36.300 V14.2.0 (Mar. 2017); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
International Search Report for PCT/CN2018/072137 dated Sep. 29, 2018.
3GPP TR 37.852 V12.0.0 (Dec. 2013), 3rd Generation Partnership Project; Technical Specification Group Radio Access Network; RAN enhancements for UMTS/HSPA and LTE interworking (Release 12).
Command Line Interface Reference, Modes A-B, StarOS Release 21 .2, Chapter: APN Profile Configuration Mode, Apr. 27, 2018.
Communication pursuant to Article 94(3) EPC for EP Application 18899866.0 dated Jun. 24, 2021. (12 pages).

* cited by examiner

HANDOVER PROCESSING METHOD, NETWORK DEVICE, TERMINAL DEVICE, AND COMPUTER STORAGE MEDIUM

CROSS-REFERENCE TO RELATED APPLICATION(S)

This application is a continuation application of International Application No. PCT/CN2018/072137, filed on Jan. 10, 2018, the entire disclosure of which is hereby incorporated by reference.

TECHNICAL FIELD

The present disclosure relates to the technical field of information processing, in particular to a handover processing method, a network device, a terminal device, and a computer storage medium.

BACKGROUND

In the 5G era, a next generation radio access network (NG-RAN) can include a scenario where both a gNB and an eNB access a 5GC core network or the gNB and eNB access a 5GC core network individually. For an NR base station, messages of Handover Require sent to an AMF (access and mobility management function) are the same. When a target identification (ID) in the sent message is an eNB ID and the eNB accesses both a 5GC and an EPC, the AMF cannot determine whether to perform RAT handover (where the 5GC is unchanged, and the access of the base station is changed from the NR to the eNB) or system handover (that is the change from the 5GC to the EPC).

For a case with an N26 interface, if a UE is in a connected state, an NG-RAN determines the timing of triggering handover according to a measurement threshold value. If the UE is in an idle state, the UE sends a TAU Request to a target core network MME, which is responsible for obtaining relevant context information from an original core network and completing the location update process in a target core network. If there is no N26 interface, and the UE can recognize the indication "Support Handover Without N26" from a network side, then combined network elements can map out the 4G SM context and realize the consistency of session IP addresses. If the UE does not recognize the indication "Support Handover Without N26" from the network side, it will directly make a Tracking Area Update request. However, none of the above handover processing can guarantee the timeliness of the handover.

SUMMARY

To solve the above technical problems, implementations of the present disclosure provide a handover processing method, a network device, a terminal device, and a computer storage medium.

An implementation of the present disclosure provides a handover processing method applied to a first network device.

The method includes: when the first network device located in a first system network or a first core network is connected to a terminal device, establishing, by the first network device, a candidate connection between the terminal device and the target system network or the target core network.

The candidate connection is used for handover to the target system network or the target core network when the terminal device meets a preset condition.

An implementation of the present disclosure provides a handover processing method applied to a second network device, wherein the second network device is located in a target system network or a target core network.

The method includes: establishing a candidate connection between a terminal device and the target system network or the target core network based on control of a first network device located in the first system network or the first core network.

The candidate connection is used for handover to the target system network or the target core network when the terminal device meets a preset condition.

An implementation of the present disclosure provides a handover processing method applied to a terminal device.

The method includes: when a first network device located in a first system network or a first core network is connected to the terminal device, acquiring a candidate connection established by the first network device for the terminal device.

The candidate connection is a connection which the first network device establishes between the terminal device and a target system network or a target core network. The candidate connection is used for handover to the target system network or the target core network when the terminal device meets a preset condition.

An implementation of the present disclosure provides a first network device, wherein the device includes: a first processing unit.

The first processing unit is configured to, when the first network device located in a first system network or a first core network is connected to a terminal device, establish a candidate connection between the terminal device and the target system network or the target core network.

The candidate connection is used for handover to the target system network or the target core network when the terminal device meets a preset condition.

An implementation of the present disclosure provides a second network device, wherein the second network device is located in a target system network or a target core network, and the second network device includes: a second processing unit and a second communication unit.

The second processing unit is configured to control a second communication unit to establish a candidate connection between a terminal device and the target system network or the target core network based on control of a first network device located in the first system network or the first core network. The candidate connection is used for handover to the target system network or the target core network when the terminal device meets a preset condition.

The second communication unit is configured to establish the candidate connection between the terminal device and the target system network or the target core network.

An implementation of the present disclosure provides a terminal device. The terminal device includes a third communication unit.

The third communication unit is configured to, when a first network device located in a first system network or a first core network is connected to the terminal device, acquire a candidate connection established by the network device for the terminal device.

The candidate connection is a connection which the first network device establishes between the terminal device and a target system network or a target core network. The candidate connection is used for handover to the target system network or the target core network when the terminal device meets a preset condition.

An implementation of the present disclosure provides a network device, including: a processor and a memory for storing a computer program that is capable of being run on the processor.

The processor is configured to, when running the computer program, execute acts of the above method.

An implementation of the present disclosure provides a terminal device, including: a processor and a memory for storing a computer program that is capable of being run on the processor.

The processor is configured to, when running the computer program, execute acts of the above method.

An implementation of the present disclosure provides a computer storage medium, wherein the computer storage medium stores computer-executable instructions that, when executed, implement acts of the aforementioned method.

According to technical schemes of implementations of the present disclosure, the candidate connection in the target network can be prepared in advance for the terminal device, so that the terminal device can be more quickly and conveniently handed over to the target system network or the target core network when moving to the coverage range of the target system.

DETAILED DESCRIPTION

Figure 1:
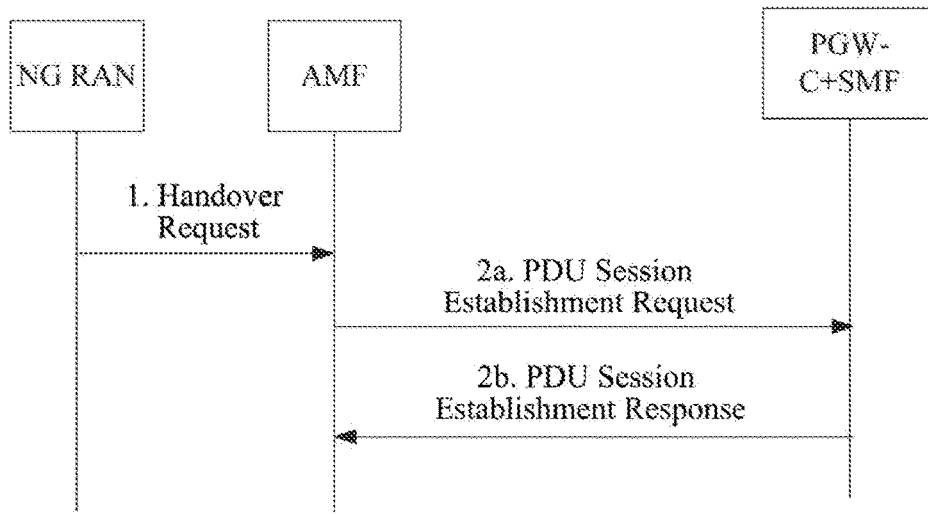
FIG. 1 is a schematic flowchart 1 of connection processing according to an implementation of the present disclosure.

To understand features and technical contents of implementations of the present disclosure in more detail, the implementation of the implementations of the present disclosure will be described in detail below with reference to the drawings, which are used for reference only and are not intended to limit the implementations of the present disclosure.

Implementation One

An implementation of the present disclosure provides a handover processing method applied to a first network device.

The method includes: when the first network device located in a first system network or a first core network is connected to a terminal device, establishing, by the first network device, a candidate connection between the terminal device and the target system network or the target core network.

The candidate connection is used for handover to the target system network or the target core network when the terminal device meets a preset condition.

Through the above scheme, when the terminal device is not handed over to the target system network or the target core network, the candidate connection can be established in advance for the terminal device in the target system network or the target core network. When the terminal is connected with the first system network or the first core network, the first system network/core network establishes a connection of the target system network/core network device for the terminal, so that the terminal can be handed over to the target system network/core network under specific conditions.

First of all, it is necessary to introduce the judgment conditions on whether to establish the candidate connection for the terminal device.

Whether to establish the candidate connection between the terminal device and the target system network or the target core network is determined based on at least one of following conditions: link quality of the terminal device, attribute information of the terminal device, service information of the terminal device, network slice information, and mobility information of the terminal device.

The details are as follows.

Condition 1: The determination of the link quality of the terminal device specifically includes: determining whether the link quality of the terminal device meets a preset threshold value; and determining that the candidate connection is established between the terminal device and the target system network or the target core network when the link quality of the terminal device meets the preset threshold value.

In other words, the first network device configures a threshold value of the terminal device. When the link quality of the terminal meets the configured threshold value, the terminal reports a measurement report to an access network of the first system network. The access network of the first system sends a handover preparation request to a core network of the first system. The core network of the first system prepares a link of the target system network or the target core network for the terminal.

Condition 2: The candidate connection is established between the terminal device and the target system network or the target core network when the terminal device is determined to be a terminal device capable of having the candidate connection established based on the attribute information of the terminal device.

The attribute information of the terminal device includes at least one of the following: priority information of the terminal, terminal type information, and terminal level information.

In other words, when the terminal is connected to the first system network or the first core network, the first system network or the first core network prepares a link of the target system network or the target core network for the terminal based on the terminal information. The network can acquire the terminal information through subscription information, or the terminal reports the terminal information.

It can be understood that in the specific process of determining that the terminal device is a terminal device capable of having the candidate connection established based on the attribute information, it can be determined that the terminal device is a terminal device capable of having the candidate connection established when the priority information of the terminal is higher than the priority threshold value. Alternatively, the terminal is a type of a terminal for processing low latency services, and it can be determined that the terminal is a terminal device capable of having the candidate connection established.

In addition, the terminal level may correspond to the terminal priority, for example, the terminal level has a level of 1-10, wherein the level of 1-3 may correspond to the priority of 1, the level of 4-7 may correspond to the priority of 2, and the level of 8-10 may correspond to the priority of 3. Therefore whether the terminal device is a terminal device capable of having the candidate connection established may be further determined based on the priority corresponding to the level. It should be understood that the foregoing terminal level is only an example, and in fact, there may be other settings, which are not exhaustive in the implementation.

Condition 3: The candidate connection is established between the terminal device and the target system network or the target core network when the service information of the terminal device indicates that a service of the terminal device is a service that conforms to a first condition. The service of the first condition is low latency service.

The service information may include QoS information of the service, etc. For example, the first system network or the first core network prepares a link of the target system network or the target core network for the terminal when the terminal has services with low latency requirements.

Condition 4: It is determined that the candidate connection is established between the terminal device and the target system network or the target core network when the network slice information conforms to a second condition.

The second condition indicates that a type of the network slice is a low latency and/or high reliability type.

For example, the first system network or the first core network prepares a link of the target system network or the target core network for the terminal when the type of the network slice has attributes of low latency and/or high reliability.

Condition 5: The candidate connection is established between the terminal device and the target system network or the target core network when the terminal device is determined to be highly mobile based on the mobility information of the terminal device.

The first system network/core network acquires the mobility information of the terminal, and prepares the link of the target system network or the target core network for the terminal when the terminal is a high mobility terminal. The first system network/core network can acquire the mobility information of the terminal from the terminal, or the access network, or subscription information, or external information, or operation maintenance.

It should be pointed out that the above-mentioned five conditions are only a few conditions illustrated in this implementation. In fact, there may be more conditions, but they are not exhaustive. Moreover, the above five conditions can be combined in use respectively, and the specific combination mode is not exhaustive.

Establishing, by the network device, the candidate connection between the terminal device and the target system network or the target core network includes: notifying the target system network or the target core network for establishing at least part of connection configurations in the candidate connection for the terminal device.

Specifically, establishing the at least part of the connection configurations in the candidate connection for the terminal device includes at least one of: modifying an internal PDU session of the target core network; establishing a connection with a serving gateway of the target core network; and establishing a connection between the target core network and an access network.

In other words, the first system network/core network device may require the target network or core network device to prepare all or part of the connection configurations for the terminal. Specifically, at least one of the above three processes is executed.

FIG. 1 shows an example of modifying the internal PDU session of the target core network, which may include: (1) sending, through an NG access network, a handover request to a core network AMF; (2a) then sending, through the AMF, a PDU session establishment request to a PGW-C SMF inside the core network, and modifying the PDU session inside the core network through the request; and (2b) further receiving feedback response information of the session establishment request.

Figure 2:
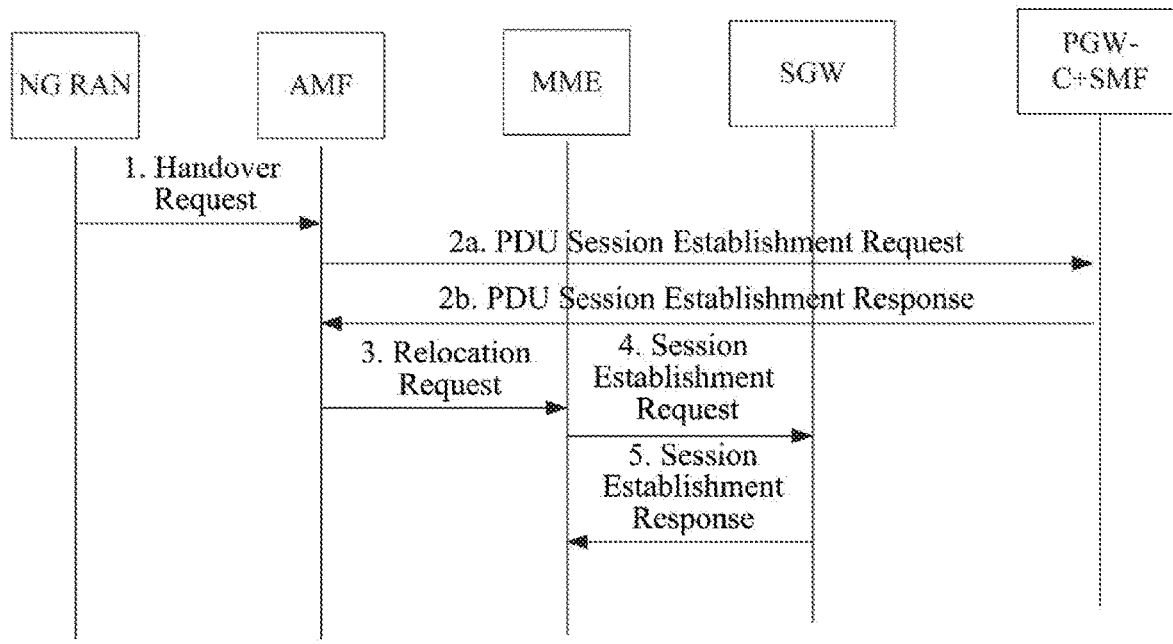
FIG. 2 is a schematic flowchart 2 of connection processing according to an implementation of the present disclosure.

On the basis of FIG. 1, FIG. 2 shows an example of establishing the connection with the serving gateway of the target core network, which specifically includes: (3) receiving, by the MME, a relocation request from the AMF, and (4-5) sending, by the MME, the session establishment request to a serving gateway (SGW) and receiving a session establishment response fed back by the SGW. Through these processes, the target core network is connected with the serving gateway and the corresponding connection configuration is obtained.

Figure 3:
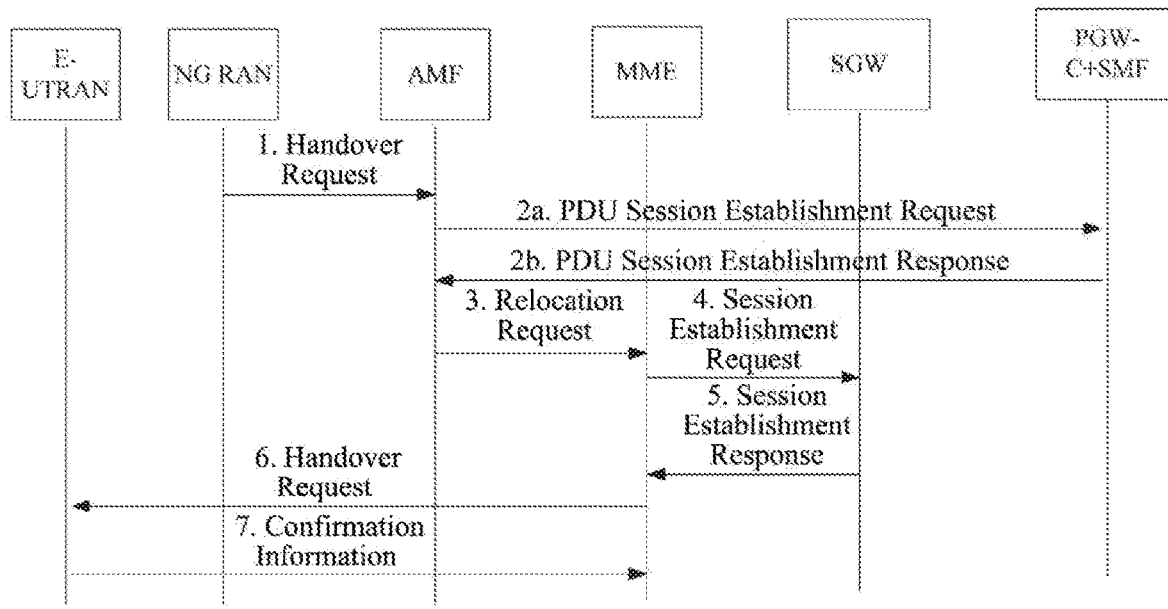
FIG. 3 is a schematic flowchart 3 of connection processing according to an implementation of the present disclosure.

Further, referring to FIG. 3, establishing the connection between the access network and the target core network may include establishing the connection between the MME and the E-UTRAN in the access network. Through the handover request and confirmation processes in (6, 7), the connection is established and the corresponding configuration can be obtained.

It should also be noted that the foregoing FIGS. 1, 2 and 3 are only examples. Based on the foregoing description, establishing the at least part of the connection configurations in the candidate connection for the terminal device may further include: establishing the connection between network devices, any two network devices, in the target core network.

The network devices in the target core network may include an AMF, an MME, an SGW, a V-SMF, a V-UPF, a PGW-C-SMF, and a PGW-C-UPF. Although these devices are not shown in the foregoing FIGS. 1, 2 and 3, they may exist in an actual core network but just have no illustration in the figures.

After the first network device establishes the candidate connection between the terminal device and the target system network or the target core network, the method further includes: sending configurations of the candidate connection to the terminal after the candidate connection is confirmed to be successfully established. In other words, when the first system network/core network device confirms that the target link is ready, the connection configurations of target network are sent to the terminal.

Figure 4:
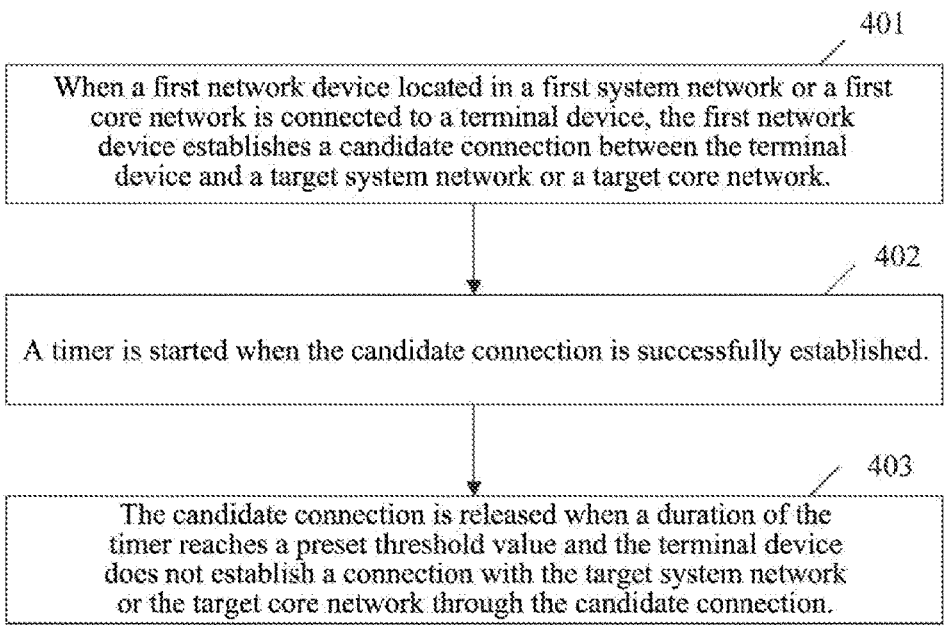
FIG. 4 is a schematic flowchart of a handover processing method according to an implementation of the present disclosure.

Finally, the scheme provided in this implementation may also include performing connection timing processing. Referring to FIG. 4, the details include the followings.

Act 401: When a first network device located in a first system network or a first core network is connected to a terminal device, the first network device establishes a candidate connection between the terminal device and a target system network or a target core network. The candidate connection is used for handover to the target system network or the target core network when the terminal device meets a preset condition.

Act 402: A timer is started when the candidate connection is successfully established.

Act 403: The candidate connection is released when a duration of the timer reaches a preset threshold value and the terminal device does not establish a connection with the target system network or the target core network through the candidate connection.

In other words, when the terminal device is not handed over to the target network within a certain period of time, in the case of no candidate connection being used, the network side does not necessarily need to maintain the configuration resources of the candidate connection all the time and can release the candidate connection after a certain period of time. The preset threshold value corresponding to the duration of the timer can be set according to the actual situation. For example, it can be set to 10 minutes, or it can be set to 1 hour, which is not limited in the implementation.

It can be seen that by adopting the above scheme, the candidate connection in the target network can be prepared in advance for the terminal device, so that the terminal device can be more quickly and conveniently handed over to the target system network or the target core network when moving to the coverage range of the target system. Thus the handover processing efficiency is improved, and the system processing efficiency is improved.

Implementation Two

An implementation of the present disclosure provides a handover processing method applied to a second network device. The second network device is located in a target system network or a target core network.

The method includes: establishing a candidate connection between a terminal device and the target system network or the target core network based on control of a first network device located in the first system network or the first core network.

The candidate connection is used for handover to the target system network or the target core network when the terminal device meets a preset condition.

Through the above scheme, when the terminal device is not handed over to the target system network or the target core network, the candidate connection can be established in advance for the terminal device in the target system network or the target core network. When the terminal is connected with the first system network or the first core network device, the first system network/core network establishes a connection of the target system network/core network device for the terminal, so that the terminal can be handed over to the target system network/core network under specific conditions.

Establishing, by the network device, the candidate connection between the terminal device and the target system network or the target core network includes: notifying the target system network or the target core network for establishing at least part of connection configurations in the candidate connection for the terminal device.

Specifically, establishing the at least part of the connection configurations in the candidate connection for the terminal device includes at least one of: modifying an internal PDU session of the target core network; establishing a connection with a serving gateway of the target core network; and establishing a connection between the target core network and an access network.

In other words, the first system network/core network device may require the target network or core network device to prepare all or part of the connection configurations for the terminal. Specifically, at least one of the above three processes is executed.

FIG. 1 shows an example of modifying the internal PDU session of the target core network, which may include: (1) sending, through an NG access network, a handover request to a core network AMF; (2a) then sending, through the AMF, a PDU session establishment request to a PGW-C SMF inside the core network, and modifying the PDU session inside the core network through the request; and (2b) further receiving feedback response information of the session establishment request.

On the basis of FIG. 1, FIG. 2 shows an example of establishing the connection with the serving gateway of the target core network, which specifically includes: (3) receiving, by the MME, a relocation request from the AMF, and (4-5) sending, by the MME, the session establishment request to a serving gateway (SGW) and receiving a session establishment response fed back by the SGW. Through these processes, the target core network is connected with the serving gateway and the corresponding connection configuration is obtained.

Further, referring to FIG. 3, establishing the connection between the access network and the target core network may include establishing the connection between the MME and the E-UTRAN in the access network. Through the handover request and confirmation processes in (6, 7), the connection is established and the corresponding configuration can be obtained.

It should also be noted that the foregoing FIGS. 1, 2 and 3 are only examples. Based on the foregoing description, establishing the at least part of the connection configurations in the candidate connection for the terminal device may further include: establishing the connection between network devices, any two network devices, in the target core network.

The network devices in the target core network may include an AMF, an MME, an SGW, a V-SMF, a V-UPF, a PGW-C-SMF, and a PGW-C-UPF. Although these devices are not shown in the foregoing FIGS. 1, 2 and 3, they may exist in an actual core network but just have no illustration in the figures.

After the first network device establishes the candidate connection between the terminal device and the target system network or the target core network, the method further includes: sending configurations of the candidate connection to the terminal after the candidate connection is confirmed to be successfully established. In other words, when the first system network/core network device confirms that the target link is ready, the connection configurations of target network are sent to the terminal.

Finally, the scheme provided in this implementation may also include performing connection timing processing. The details include the followings: starting a timer when the candidate connection is successfully established; and releasing the candidate connection when a duration of the timer reaches a preset threshold value and the terminal device does not establish a connection with the target system network or the target core network through the candidate connection.

In other words, when the terminal device is not handed over to the target network within a certain period of time, in the case of no candidate connection being used, the target network side does not necessarily need to maintain the configuration resources of the candidate connection all the time and can release the candidate connection after a certain period of time. The preset threshold value corresponding to the duration of the timer can be set according to the actual situation. For example, it can be set to 10 minutes, or it can be set to 1 hour, which is not limited in the implementation.

It can be seen that by adopting the above scheme, the candidate connection in the target network can be prepared in advance for the terminal device, so that the terminal device can be more quickly and conveniently handed over to the target system network or the target core network when moving to the coverage range of the target system. Thus the handover processing efficiency is improved, and the system processing efficiency is improved.

Implementation Three

An implementation of the present disclosure provides a handover processing method applied to a terminal device.

The method includes: when a first network device located in a first system network or a first core network is connected to the terminal device, acquiring a candidate connection established by the first network device for the terminal device.

The candidate connection is a connection which the first network device establishes between the terminal device and a target system network or a target core network; wherein the candidate connection is used for handover to the target system network or the target core network when the terminal device meets a preset condition.

Through the above scheme, when the terminal device is not handed over to the target system network or the target core network, the candidate connection can be established in advance for the terminal device in the target system network or the target core network. When the terminal is connected with the first system network or the first core network device, the first system network/core network establishes a connection of the target system network/core network device for the terminal, so that the terminal can be handed over to the target system network/core network under specific conditions.

Different from the two previous implementations, the method provided in this implementation, after the candidate connection established by the network device for the terminal device is acquired, further includes: when the terminal device enters a coverage range of the target system network or the target core network, establishing a connection with the target system network or the target core network based on network connection configurations corresponding to the candidate connection.

It can be seen that by adopting the above scheme, the candidate connection in the target network can be prepared in advance for the terminal device, so that the terminal device can be more quickly and conveniently handed over to the target system network or the target core network when moving to the coverage range of the target system. Thus the handover processing efficiency is improved, and the system processing efficiency is improved.

Implementation Four

Figure 5:
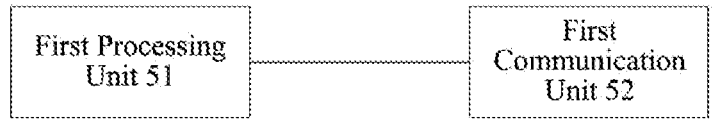
FIG. 5 is a schematic diagram of structure of a first network device according to an implementation of the present disclosure.

An implementation of the present disclosure provides a first network device. As shown in FIG. 5, the first network device includes a first processing unit 51.

The first processing unit 51 is configured to, when the first network device located in a first system network or a first core network is connected to a terminal device, establish a candidate connection between the terminal device and the target system network or the target core network.

The candidate connection is used for handover to the target system network or the target core network when the terminal device meets a preset condition.

Through the above scheme, when the terminal device is not handed over to the target system network or the target core network, the candidate connection can be established in advance for the terminal device in the target system network or the target core network. When the terminal is connected with the first system network or the first core network device, the first system network/core network establishes a connection of the target system network/core network device for the terminal, so that the terminal can be handed over to the target system network/core network under specific conditions.

First of all, it is necessary to introduce the judgment conditions on whether to establish the candidate connection for the terminal device.

Whether to establish the candidate connection between the terminal device and the target system network or the target core network is determined based on at least one of following conditions: link quality of the terminal device, attribute information of the terminal device, service information of the terminal device, network slice information, and mobility information of the terminal device.

The details are as follows.

Condition 1: The determination of the link quality of the terminal device is specifically as follows: The first processing unit 51 is configured to: determine whether the link quality of the terminal device meets a preset threshold value; and determine that the candidate connection is established between the terminal device and the target system network or the target core network when the link quality of the terminal device meets the preset threshold value.

In other words, the first network device configures a threshold value of the terminal device. When the link quality of the terminal meets the configured threshold value, the terminal reports a measurement report to an access network of the first system network. The access network of the first system sends a handover preparation request to a core network of the first system. The core network of the first system prepares a link of the target system network or the target core network for the terminal.

Condition 2: The first processing unit 51 is configured to establish the candidate connection between the terminal device and the target system network or the target core network when the terminal device is determined to be a terminal device capable of having the candidate connection established based on the attribute information of the terminal device.

The attribute information of the terminal device includes at least one of the following: priority information of the terminal, terminal type information, and terminal level information.

In other words, when the terminal is connected to the first system network or the first core network, the first system network or the first core network prepares a link of the target system network or the target core network for the terminal based on the terminal information. The network can acquire the terminal information through subscription information, or the terminal reports the terminal information.

It can be understood that in the specific process of determining that the terminal device is a terminal device capable of having the candidate connection established based on the attribute information, it can be determined that the terminal device is a terminal device capable of having the candidate connection established when the priority information of the terminal is higher than the priority threshold value. Alternatively, the terminal is a type of a terminal for processing low latency services, and it can be determined that the terminal is a terminal device capable of having the candidate connection established.

In addition, the terminal level may correspond to the terminal priority, for example, the terminal level has a level of 1-10, wherein the level of 1-3 may correspond to the priority of 1, the level of 4-7 may correspond to the priority of 2, and the level of 8-10 may correspond to the priority of 3. Therefore, whether the terminal device is a terminal device capable of having the candidate connection established may be further determined based on the priority corresponding to the level. It should be understood that the foregoing terminal level is only an example, and in fact, there may be other settings, which are not exhaustive in the implementation.

Condition 3: The first processing unit 51 is configured to establish the candidate connection between the terminal device and the target system network or the target core network when the service information of the terminal device indicates that a service of the terminal device is a service that conforms to a first condition. The service of the first condition is low latency service.

The service information may include QoS information of the service, etc. For example, the first system network or the first core network prepares a link of the target system network or the target core network for the terminal when the terminal has services with low latency requirements.

Condition 4: The first processing unit 51 is configured to determine that the candidate connection is established between the terminal device and the target system network or the target core network when the network slice information conforms to a second condition.

The second condition indicates that a type of the network slice is a low latency and/or high reliability type.

For example, the first system network or the first core network prepares a link of the target system network or the target core network for the terminal when the type of the network slice has attributes of low latency and/or high reliability.

Condition 5: The first processing unit 51 is configured to establish the candidate connection between the terminal device and the target system network or the target core network when the terminal device is determined to be highly mobile based on the mobility information of the terminal device.

The first system network/core network acquires the mobility information of the terminal, and prepares the link of the target system network or the target core network for the terminal when the terminal is a high mobility terminal. The first system network/core network can acquire the mobility information of the terminal from the terminal, or the access network, or subscription information, or external information, or operation maintenance.

It should be pointed out that the above-mentioned five conditions are only a few conditions illustrated in this implementation. In fact, there may be more conditions, but they are not exhaustive. Moreover, the above five conditions can be combined in use respectively, and the specific combination mode is not exhaustive.

The first network device further includes: a first communication unit 52 configured to notify the target system network or the target core network for establishing at least part of connection configurations in the candidate connection for the terminal device.

Specifically, establishing the at least part of the connection configurations in the candidate connection for the terminal device includes at least one of: modifying an internal PDU session of the target core network; establishing a connection with a serving gateway of the target core network; and establishing a connection between the target core network and an access network.

In other words, the first system network/core network device may require the target network or core network device to prepare all or part of the connection configurations for the terminal. Specifically, at least one of the above three processes is executed:

FIG. 1 shows an example of modifying the internal PDU session of the target core network, which may include: (1) sending, through an NG access network, a handover request to a core network AMF; (2a) then sending, through the AMF, a PDU session establishment request to a PGW-C SMF inside the core network, and modifying the PDU session inside the core network through the request; and (2b) further receiving feedback response information of the session establishment request.

On the basis of FIG. 1, FIG. 2 shows an example of establishing the connection with the serving gateway of the target core network, which specifically includes: (3) receiving, by the MME, a relocation request from the AMF, and (4-5) sending, by the MME, the session establishment request to a serving gateway (SGW) and receiving a session establishment response fed back by the SGW. Through these processes, the target core network is connected with the serving gateway and the corresponding connection configuration is obtained.

Further, referring to FIG. 3, establishing the connection between the access network and the target core network may include establishing the connection between the MME and the E-UTRAN in the access network. Through the handover request and confirmation processes in (6, 7), the connection is established and the corresponding configuration can be obtained.

It should also be noted that the foregoing FIGS. 1, 2 and 3 are only examples. Based on the foregoing description, establishing the at least part of the connection configurations in the candidate connection for the terminal device may further include: establishing the connection between network devices, any two network devices, in the target core network.

The network devices in the target core network may include an AMF, an MME, an SGW, a V-SMF, a V-UPF, a PGW-C-SMF, and a PGW-C-UPF. Although these devices are not shown in the foregoing FIGS. 1, 2 and 3, they may exist in an actual core network but just have no illustration in the figures.

After the first network device establishes the candidate connection between the terminal device and the target system network or the target core network, the first network device further includes: a first communication unit 52 configured to send configuration of the candidate connection to the terminal after the candidate connection is confirmed to be successfully established. In other words, when the first system network/core network device confirms that the target link is ready, the connection configurations of target network are sent to the terminal.

The first processing unit is configured to: start a timer when the candidate connection is successfully established. The candidate connection is released when a duration of the timer reaches a preset threshold value and the terminal device does not establish a connection with the target system network or the target core network through the candidate connection.

In other words, when the terminal device is not handed over to the target network within a certain period of time, in the case of no candidate connection being used, the network side does not necessarily need to maintain the configuration resources of the candidate connection all the time and can release the candidate connection after a certain period of time. The preset threshold value corresponding to the duration of the timer can be set according to the actual situation. For example, it can be set to 10 minutes, or it can be set to 1 hour, which is not limited in the implementation.

It can be seen that by adopting the above scheme, the candidate connection in the target network can be prepared in advance for the terminal device, so that the terminal device can be more quickly and conveniently handed over to the target system network or the target core network when moving to the coverage range of the target system. Thus the handover processing efficiency is improved, and the system processing efficiency is improved.

Implementation Five

Figure 6:
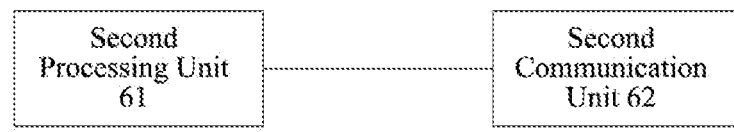
FIG. 6 is a schematic diagram of structure of a second network device according to an implementation of the present disclosure.

An implementation of the present disclosure provides a second network device, wherein the second network device is located in a target system network or a target core network. As shown in FIG. 6, the second network device includes: a second processing unit 61 configured to control a second communication unit to establish a candidate connection between a terminal device and the target system network or the target core network based on control of a first network device located in the first system network or the first core network. The candidate connection is used for handover to the target system network or the target core network when the terminal device meets a preset condition;

a second communication unit 62 configured to establish the candidate connection between the terminal device and the target system network or the target core network.

Through the above scheme, when the terminal device is not handed over to the target system network or the target core network, the candidate connection can be established in advance for the terminal device in the target system network or the target core network. When the terminal is connected with the first system network or the first core network device, the first system network/core network establishes a connection of the target system network/core network device for the terminal, so that the terminal can be handed over to the target system network/core network under specific conditions.

Establishing, by the network device, the candidate connection between the terminal device and the target system network or the target core network includes: notifying the target system network or the target core network for establishing at least part of connection configurations in the candidate connection for the terminal device.

Specifically, establishing the at least part of the connection configurations in the candidate connection for the terminal device includes at least one of: modifying an internal PDU session of the target core network; establishing a connection with a serving gateway of the target core network; and establishing a connection between the target core network and an access network.

In other words, the first system network/core network device may require the target network or core network device to prepare all or part of the connection configurations for the terminal. Specifically, at least one of the above three processes is executed:

FIG. 1 shows an example of modifying the internal PDU session of the target core network, which may include: (1) sending, through an NG access network, a handover request to a core network AMF; (2a) then sending, through the AMF, a PDU session establishment request to a PGW-C SMF inside the core network, and modifying the PDU session inside the core network through the request; and (2b) further receiving feedback response information of the session establishment request.

On the basis of FIG. 1, FIG. 2 shows an example of establishing the connection with the serving gateway of the target core network, which specifically includes: (3) receiving, by the MME, a relocation request from the AMF, and (4-5) sending, by the MME, the session establishment request to a serving gateway (SGW) and receiving a session establishment response fed back by the SGW. Through these processes, the target core network is connected with the serving gateway and the corresponding connection configuration is obtained.

Further, referring to FIG. 3, establishing the connection between the access network and the target core network may include establishing the connection between the MME and the E-UTRAN in the access network. Through the handover request and confirmation processes in (6, 7), the connection is established and the corresponding configuration can be obtained.

It should also be noted that the foregoing FIGS. 1, 2 and 3 are only examples. Based on the foregoing description, establishing the at least part of the connection configurations in the candidate connection for the terminal device may further include: establishing the connection between network devices, any two network devices, in the target core network.

The network devices in the target core network may include an AMF, an MME, an SGW, a V-SMF, a V-UPF, a PGW-C-SMF, and a PGW-C-UPF. Although these devices are not shown in the foregoing FIGS. 1, 2 and 3, they may exist in an actual core network but just have no illustration in the figures.

The second processing unit is configured to: send configurations of the candidate connection to the terminal after the candidate connection is confirmed to be successfully established. In other words, when the first system network/core network device confirms that the target link is ready, the connection configurations of target network are sent to the terminal.

Finally, the scheme provided in this implementation may also include performing connection timing processing. The details include the followings: The second processing unit is configured to: start a timer when the candidate connection is successfully established; and control the second communication unit to release the candidate connection when a duration of the timer reaches a preset threshold value and the terminal device does not establish a connection with the target system network or the target core network through the candidate connection.

In other words, when the terminal device is not handed over to the target network within a certain period of time, in the case of no candidate connection being used, the target network side does not necessarily need to maintain the configuration resources of the candidate connection all the time and can release the candidate connection after a certain period of time. The preset threshold value corresponding to the duration of the timer can be set according to the actual situation. For example, it can be set to 10 minutes, or it can be set to 1 hour, which is not limited in the implementation.

It can be seen that by adopting the above scheme, the candidate connection in the target network can be prepared in advance for the terminal device, so that the terminal device can be more quickly and conveniently handed over to the target system network or the target core network when moving to the coverage range of the target system. Thus the handover processing efficiency is improved, and the system processing efficiency is improved.

Implementation Six

Figure 7:
FIG. 7 is a schematic diagram of structure of a terminal device according to an implementation of the present disclosure.

An implementation of the present disclosure provides a terminal device. As shown in FIG. 7. the terminal device includes a third communication unit 71.

The third communication unit 71 is configured to, when a first network device located in a first system network or a first core network is connected to the terminal device, acquire a candidate connection established by the network device for the terminal device.

The candidate connection is a connection which the first network device establishes between the terminal device and a target system network or a target core network. The candidate connection is used for handover to the target system network or the target core network when the terminal device meets a preset condition.

Through the above scheme, when the terminal device is not handed over to the target system network or the target core network, the candidate connection can be established in advance for the terminal device in the target system network or the target core network. When the terminal is connected with the first system network or the first core network device, the first system network/core network establishes a connection of the target system network/core network device for the terminal, so that the terminal can be handed over to the target system network/core network under specific conditions.

Different from the two previous implementations, the terminal device provided in the implementation, the terminal device further includes: a third processing unit 72 and a third communication unit 71.

The third processing unit 72 is configured to, when the terminal device enters a coverage range of the target system network or the target core network, control the third communication unit to establish a connection with the target system network or the target core network based on network connection configurations corresponding to the candidate connection.

The third communication unit 71 is configured to establish the connection with the target system network or the target core network.

It can be seen that by adopting the above scheme, the candidate connection in the target network can be prepared in advance for the terminal device, so that the terminal device can be more quickly and conveniently handed over to the target system network or the target core network when moving to the coverage range of the target system. Thus the handover processing efficiency is improved, and the system processing efficiency is improved.

Figure 8:
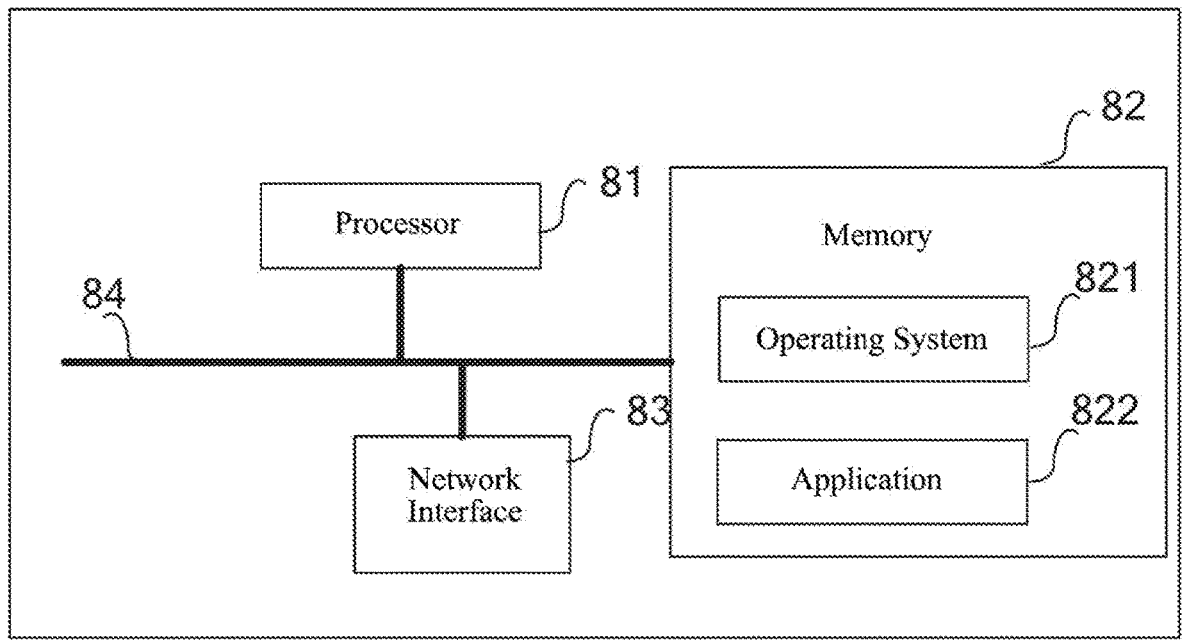
FIG. 8 is a schematic diagram of architecture of hardware according to an implementation of the present disclosure.

An implementation of the present disclosure also provides architecture of hardware composition of a terminal device or a network device, which includes at least one processor 81, a memory 82, and at least one network interface 83, as shown in FIG. 8. The various components are coupled together by a bus system 84. It may be understood that the bus system 84 is used for implementing connection and communication between these components. In addition to a data bus, the bus system 84 includes a power bus, a control bus, and a status signal bus. However, for clarity, all kinds of buses are uniformly referred to as a bus system 84 in the FIG. 8.

It should be understood that the memory 82 in the implementation of the present disclosure may be a transitory memory or a non-transitory memory, or it may include both transitory and non-transitory memory.

In some implementations, the memory 82 stores following elements, executable modules or data structures, or subsets thereof, or extended sets thereof: an operating system 821 and application 822.

The processor 81 is configured to process acts in any method of the implementation one to three, which will not be described here.

An implementation of the present disclosure provides a computer storage medium storing computer executable instructions, and when the computer executable instructions are executed, the acts in any method of the implementation one to three are implemented.

The above device in the implementations of the present disclosure may also be stored in a computer readable storage medium when it is implemented in the form of a software function module and sold or used as an independent product. Based on this understanding, the technical solutions in the implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes a U disk, a mobile hard disk, a read-only memory (ROM), a magnetic disk or an optical disk, and another media capable of storing program codes. Thus, the implementations of the present disclosure are not limited to any specific combination of hardware and software.

Correspondingly, an implementation of the present disclosure also provides a computer storage medium in which a computer program is stored, and the computer program is configured to execute the data scheduling method in the implementations of the present disclosure.

Although the preferable implementations of the present disclosure have been disclosed for illustrative purposes, those skilled in the art will recognize that various modifications, additions and substitutions are also possible, and therefore, the scope of the present disclosure should not be limited to the above implementations.

What is claimed is:

1. A first network device, comprising:
    a processor configured to, when the first network device located in a first system network or a first core network is connected to a terminal device, establish a candidate connection between the terminal device and one of a target system network or a target core network;
    wherein the candidate connection is used for handover to the target system network or the target core network when the terminal device meets a preset condition;
    wherein the processor is configured to determine whether to establish the candidate connection between the terminal device and the target system network or the target core network based on mobility information of the terminal device, and
    wherein the processor is configured to establish the candidate connection between the terminal device and the target system network or the target core network when the terminal device is determined to be highly mobile based on the mobility information of the terminal device.

2. The first network device of claim 1, wherein the processor is configured to determine whether to establish the candidate connection between the terminal device and the target system network or the target core network based on at least one of following conditions:

link quality of the terminal device, attribute information of the terminal device, service information of the terminal device, or network slice information.

3. The first network device of claim 2, wherein the processor is configured to:
determine whether the link quality of the terminal device meets a preset threshold value; and
determine that the candidate connection is established between the terminal device and the target system network or the target core network when the link quality of the terminal device meets the preset threshold value.

4. The first network device of claim 2, wherein the processor is configured to establish the candidate connection between the terminal device and the target system network or the target core network when the terminal device is determined to be a terminal device capable of having the candidate connection established based on the attribute information of the terminal device; and
wherein the attribute information of the terminal device comprises at least one of the following: priority information of the terminal, terminal type information, and terminal level information.

5. The first network device of claim 2, wherein the processor is configured to establish the candidate connection between the terminal device and the target system network or the target core network when the service information of the terminal device indicates that a service of the terminal device is a service that conforms to a first condition.

6. The first network device of claim 5, wherein the service of the first condition is low latency service.

7. The first network device of claim 2, wherein the processor is configured to determine that the candidate connection is established between the terminal device and the target system network or the target core network when the network slice information conforms to a second condition.

8. The first network device of claim 7, wherein the second condition indicates that a type of the network slice is a low latency and/or high reliability type.

9. The first network device of claim 1, further comprising:
a network interface configured to notify the target system network or the target core network for establishing at least part of connection configurations in the candidate connection for the terminal device.

10. The first network device of claim 9, wherein establishing the at least part of the connection configurations in the candidate connection for the terminal device comprise at least one of:
modifying an internal PDU session of the target core network;
establishing a connection with a serving gateway of the target core network; or
establishing a connection between the target core network and an access network.

11. The first network device of claim 1, further comprising:
a network interface configured to send configurations of the candidate connection to the terminal after the candidate connection is confirmed to be successfully established.

12. The first network device of claim 1, wherein the processor is configured to:
start a timer when the candidate connection is successfully established; and release the candidate connection when a duration of the timer reaches a preset threshold value and the terminal device does not establish a connection with the target system network or the target core network through the candidate connection.

13. A method of handover processing, applied to a first network device, wherein the method comprises:
when the first network device is located in a first system network or a first core network that is connected to a terminal device, establishing, by the first network device, a candidate connection between the terminal device and a target system network or a target core network, wherein the candidate connection is used for handover to the target system network or the target core network when the terminal device meets a preset condition;
determining whether to establish the candidate connection between the terminal device and the target system network or the target core network based on mobility information of the terminal device; and
establishing the candidate connection between the terminal device and the target system network or the target core network in response to the terminal device being determined to be highly mobile based on the mobility information of the terminal device.

14. The method of claim 13, wherein the method comprises:
determining whether to establish the candidate connection between the terminal device and the target system network or the target core network further based on at least one of following conditions:
link quality of the terminal device, attribute information of the terminal device, service information of the terminal device, or network slice information.

15. The method of claim 14, wherein the method further comprises:
determining whether the link quality of the terminal device meets a preset threshold value; and
determining that the candidate connection is established between the terminal device and the target system network or the target core network in response to the link quality of the terminal device meeting the preset threshold value.

16. The method of claim 14, wherein the method further comprises:
establishing the candidate connection between the terminal device and the target system network or the target core network in response to the terminal device being determined to be a terminal device capable of having the candidate connection established based on the attribute information of the terminal device, wherein the attribute information of the terminal device comprises at least one of the following: priority information of the terminal, or terminal type information.

17. The method of claim 14, wherein the method further comprises:
establishing the candidate connection between the terminal device and the target system network or the target core network in response to the service information of the terminal device indicating that a service of the terminal device is a service that conforms to a first condition.

18. The method of claim 17, wherein the service of the first condition is low latency service.

19. The method of claim 14, wherein the method further comprises:
determining that the candidate connection is to be established between the terminal device and the target system network or the target core network in response to the network slice information conforming to a second condition.

20. A non-transitory computer storage medium storing computer-executable instructions, wherein the computer-executable instructions, when executed, implement acts of the method of claim 13.

\* \* \* \* \*